Dec. 29, 1936.  J. R. BROWN  2,065,646
HIGH PRESSURE LIQUID LEVEL GAUGE
Filed Feb. 8, 1933  2 Sheets-Sheet 1

INVENTOR.
John Rowland Brown
BY
Fay, Oberlin & Fay
ATTORNEYS.

Dec. 29, 1936.  J. R. BROWN  2,065,646
HIGH PRESSURE LIQUID LEVEL GAUGE
Filed Feb. 8, 1933  2 Sheets-Sheet 2

INVENTOR.
John Rowland Brown
BY
Fay, Oberlin & Fay
ATTORNEYS.

Patented Dec. 29, 1936

2,065,646

UNITED STATES PATENT OFFICE 2,065,646

HIGH PRESSURE LIQUID LEVEL GAUGE

John Rowland Brown, Cleveland Heights, Ohio, assignor to The Reliance Gauge Column Company, Cleveland, Ohio, a corporation of Ohio Application February 8, 1933, Serial No. 655,700

4 Claims. (Cl. 73—54)

In liquid-level gauges subjected to high pressures at high temperatures, disproportionately drastic handicaps are encountered. While it is desired to keep fluid passageways as small as possible and the entire device light and free from clumsiness, tendencies to restriction of free level-response and tendencies to slight distortion and leakage have militated in general against such ideal. When efforts have been made to accentuate visibility by dividing the sight-chamber up into non-aligned sections, these difficulties have been particularly encountered. A gauge construction which presents fool-proof visibility, together with free level-response and general security is accordingly an important desideratum.

To the accomplishment of the foregoing and related ends, the invention, then, comprises the features hereinafter fully described, and particularly pointed out in the claims, the following description and the annexed drawings setting forth in detail certain illustrative embodiments of the invention, these being indicative however, of but a few of the various ways in which the principle of the invention may be employed.

In said annexed drawings:—

Figure 1:
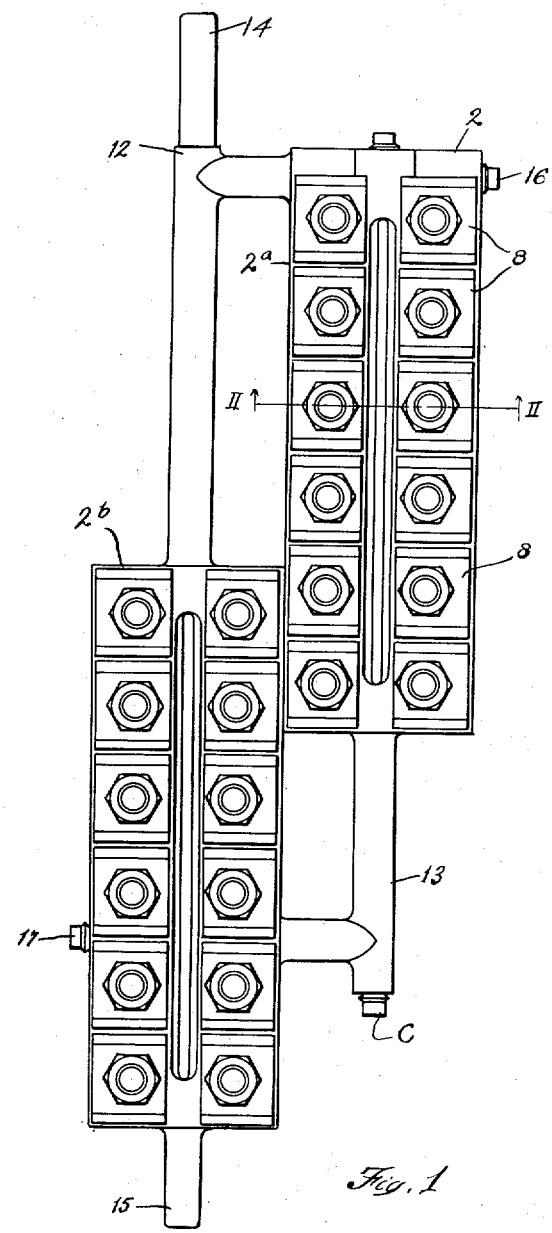
Figure 2:
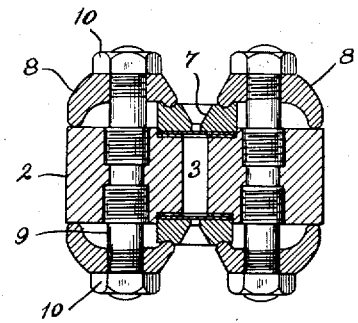
Figure 3:
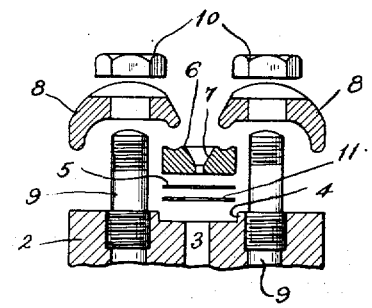
Figure 4:
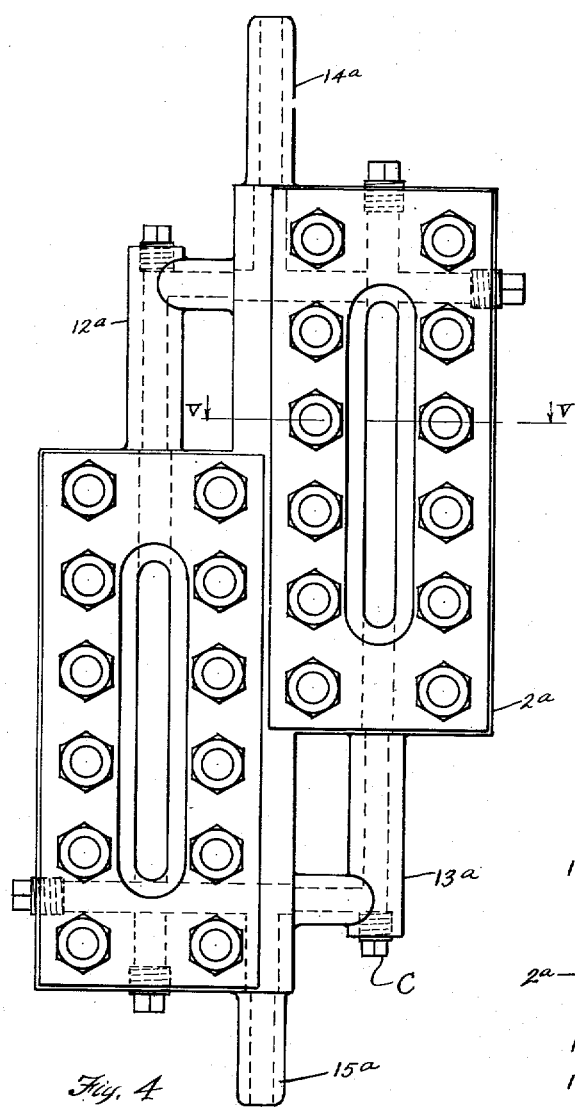
Figure 5:
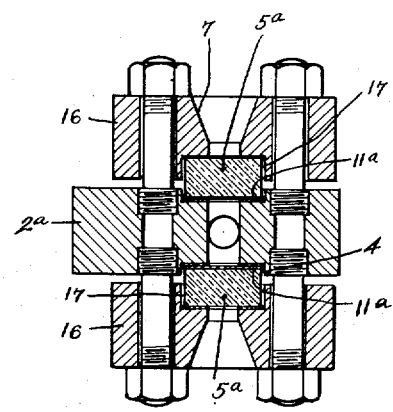

Fig. 1 is a front elevational view of an embodiment of the invention; Fig. 2 is a transverse section on an enlarged scale, taken on a plane substantially indicated by line II—II, Fig. 1; Fig. 3 is a fragmentary similar sectional view disassembled; and Figs. 4 and 5 are front elevational and sectional views of a modification.

In its general aspects, the invention contemplates a liquid-level gauge having sight slot-chambers in parallel relation, one extending higher than the other, and having transparent covers on the slot portions of the chamber members. As shown in Figs. 1 and 2, a convenient construction involves a heavy body member 2 which may be initially integral for both the upper and lower portions, or which may be assembled by welding the two corresponding portions together. Slots 3 are formed in the respective portions, and over each slot is a recess or cut-out 4 sized to receive the transparent cover member. While the transparent cover member may in some cases be suitably heavy glass plates or strips, generally it is preferable to employ a flexible transparent non-corroding material, such as mica 5. In such case, a backing-up or cover plate 6 is superposed thereover. The cover plate is slotted to correspond in general to the slot of the member 2, but the opening is in general narrower, and desirably is beveled as at 7. Seating against the cover plate is a plurality of clamping members 8, preferably in the form of lever-clamps, one arm of which engages the cover plate, while the other arm engages the body member 2. Bolts or screw threaded studs 9, with nuts 10, complete the assembly. A gasket 11 is of course desirably interposed between the body member 2 and the transparent cover, such gasket also being slotted to correspond with the general opening.

In its features of passageway connection, the assembly provides a conduit 12 which connects with the upper portion of the upper member 2$^a$, branching thereto, and with the upper portion of the lower member 2$^b$, and again another conduit 13 connecting the lower portion of the upper member 2$^a$ and the lower portion of the lower member 2$^b$. Connection nipples 14, 15 are provided for joining with the water column, in usual or preferred manner. Opposite the branch of the conduit 12 leading into the upper portion of the upper member 2$^a$ is a plug 16, screw threadedly secured, whereby cleaning of the horizontal passage may be readily accomplished, and similarly a plug 17 is provided opposite the connection of the conduit 13 in the lower member 2$^b$. The sight slot-members are thus in generally parallel relation simultaneously visible, overlapping for some little distance or one slot-chamber is shorter above and the other is shorter below. As a result, the liquid meniscus is always clearly visible in both slots at the optimum or one slot or the other, and mistake is avoided.

The form of the invention shown in Fig. 1, provides the further advantage of so positioning the slot-chambers that the important matter of illumination can be particularly well taken care of for the critical region. The upper chamber is mounted so as to stand off from the mounting center line of the connection-nipples 14, 15, allowing easy adaptation of lighting means at the rear, free from interference by the water column.

In the form of the invention shown in Figs. 4 and 5, the slot-chambers may be provided in one general block-member 2$^a$ having the connection-nipples 14$^a$, 15$^a$, aligned center-wise with respective bores, while the upper portions of the slot-chambers are connected by conduit 12$^a$ and the lower portions by conduit 13$^a$. If glass is used for the transparent cover material, this in the form of plates 5$^a$ and provided with suitable packing gaskets 11$^a$ may be clamped in position by heavy metal plates 16, these being provided with recesses 17 opposite the recesses 4 in the body member 2$^a$, and again, being shaped with a beveled edge about the slot to increase visibility.

As readily seen from the foregoing, the gauge as assembled and connected to the water column or desired portion of the device, such as the boiler to be equipped, allows free access of steam and water to the slot-chambers in such manner as to insure, at all times, free response to the fluctuating level in the boiler, and whereas in prior efforts at providing visibility-chambers in staggered relation particular difficulties have occurred in attaining a satisfactory mounting, and manufacturing troubles have been out of all proportion to the results obtained, by reason of the excessively long drilling which has been necessary, the present invention eliminates the latter, thus making possible a construction suitable for manufacture, as well as particularly safe and desirable in its mounting relations.

Other modes of applying the principle of the invention may be employed, change being made as regards the details described, provided the features stated in any of the following claims or the equivalent of such, be employed.

I therefore particularly point out and distinctly claim as my invention:—

1. A liquid-level gauge for high pressures comprising sight slot-chambers in parallel simultaneously visible relation, one extending higher than the other to provide complementary indications of liquid level, transparent covers on said slot chambers, a conduit extending upward from the upper portion of the lower slot-chamber and in alignment therewith, a connection from said conduit to the upper portion of said upper slot-chamber, and an angular connection between the lower portions of said slot-chambers.

2. A liquid-level gauge for high pressures comprising sight slot-chambers in parallel simultaneously visible relation, one extending higher than the other to provide complementary indications of liquid level, transparent covers on said slot-chambers, means for connecting said slot-chambers in parallel fluid-circuit, including horizontal passages wholly above and below the fluctuating water-surface range, and a passage extending upward from the upper portion of the lever slot-chamber.

3. A liquid-level gauge for high pressures comprising sight slot-chambers in parallel simultaneously visible relation, one extending higher than the other to provide complementary indications of liquid level, transparent covers on said slot-chambers, means for connecting said slot-chambers in parallel fluid-circuit, said slot-chambers having communication with each other only at their upper portions and their lower portions, and central upper and lower connections for communication with a boiler.

4. A liquid-level gauge for high pressures comprising sight slot-chambers in parallel simultaneously visible relation, one extending higher than the other to provide complementary indications of liquid level, transparent covers on said slot-chambers, means for connecting said slot-chambers in parallel fluid-circuit, and conduits extending upward from the upper portion of the lower slot-chamber and downward from the lower portion of the lower slot-chamber for communication with a boiler.

JOHN ROWLAND BROWN.

CERTIFICATE OF CORRECTION.

Patent No. 2,065,646. December 29, 1936

JOHN ROWLAND BROWN.

It is hereby certified that error appears in the printed specification of the above numbered patent requiring correction as follows: Page 2, second column, line 11, claim 2, for the word "lever" read lower; and that the said Letters Patent should be read with this correction therein that the same may conform to the record of the case in the Patent Office.

Signed and sealed this 23rd day of February, A. D. 1937.

(Seal)

Henry Van Arsdale
Acting Commissioner of Patents.

as assembled and connected to the water column or desired portion of the device, such as the boiler to be equipped, allows free access of steam and water to the slot-chambers in such manner as to insure, at all times, free response to the fluctuating level in the boiler, and whereas in prior efforts at providing visibility-chambers in staggered relation particular difficulties have occurred in attaining a satisfactory mounting, and manufacturing troubles have been out of all proportion to the results obtained, by reason of the excessively long drilling which has been necessary, the present invention eliminates the latter, thus making possible a construction suitable for manufacture, as well as particularly safe and desirable in its mounting relations.

Other modes of applying the principle of the invention may be employed, change being made as regards the details described, provided the features stated in any of the following claims or the equivalent of such, be employed.

I therefore particularly point out and distinctly claim as my invention:—

1. A liquid-level gauge for high pressures comprising sight slot-chambers in parallel simultaneously visible relation, one extending higher than the other to provide complementary indications of liquid level, transparent covers on said slot chambers, a conduit extending upward from the upper portion of the lower slot-chamber and in alignment therewith, a connection from said conduit to the upper portion of said upper slot-chamber, and an angular connection between the lower portions of said slot-chambers.

2. A liquid-level gauge for high pressures comprising sight slot-chambers in parallel simultaneously visible relation, one extending higher than the other to provide complementary indications of liquid level, transparent covers on said slot-chambers, means for connecting said slot-chambers in parallel fluid-circuit, including horizontal passages wholly above and below the fluctuating water-surface range, and a passage extending upward from the upper portion of the lever slot-chamber.

3. A liquid-level gauge for high pressures comprising sight slot-chambers in parallel simultaneously visible relation, one extending higher than the other to provide complementary indications of liquid level, transparent covers on said slot-chambers, means for connecting said slot-chambers in parallel fluid-circuit, said slot-chambers having communication with each other only at their upper portions and their lower portions, and central upper and lower connections for communication with a boiler.

4. A liquid-level gauge for high pressures comprising sight slot-chambers in parallel simultaneously visible relation, one extending higher than the other to provide complementary indications of liquid level, transparent covers on said slot-chambers, means for connecting said slot-chambers in parallel fluid-circuit, and conduits extending upward from the upper portion of the lower slot-chamber and downward from the lower portion of the lower slot-chamber for communication with a boiler.

JOHN ROWLAND BROWN.

CERTIFICATE OF CORRECTION.

Patent No. 2,065,646.   December 29, 1936

JOHN ROWLAND BROWN.

It is hereby certified that error appears in the printed specification of the above numbered patent requiring correction as follows: Page 2, second column, line 11, claim 2, for the word "lever" read lower; and that the said Letters Patent should be read with this correction therein that the same may conform to the record of the case in the Patent Office.

Signed and sealed this 23rd day of February, A. D. 1937.

(Seal)

Henry Van Arsdale
Acting Commissioner of Patents.

CERTIFICATE OF CORRECTION.

Patent No. 2,065,646.                                        December 29, 1936

JOHN ROWLAND BROWN.

It is hereby certified that error appears in the printed specification of the above numbered patent requiring correction as follows: Page 2, second column, line 11, claim 2, for the word "lever" read lower; and that the said Letters Patent should be read with this correction therein that the same may conform to the record of the case in the Patent Office.

Signed and sealed this 23rd day of February, A. D. 1937.

(Seal)

Henry Van Arsdale
Acting Commissioner of Patents.